United States Patent
Ostermann et al.

(10) Patent No.: US 6,422,589 B1
(45) Date of Patent: *Jul. 23, 2002

(54) RECYCLABLE AIRBAG MODULE HOUSING

(75) Inventors: Folkert J Ostermann, Furth; Detlev Wilhelm Guthke, Leverkusen; Jens Hannemann, Wuppertal; Udo Jacobs, Koenigswinter, all of (DE); Jeffrey Alan Shepherd, Troy, OH (US); Traci Carol Baert, Commerce, MI (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,123

(22) Filed: Dec. 18, 1998

(51) Int. Cl.$^7$ .............................................. B60R 21/16
(52) U.S. Cl. ..................................... 280/728.2; 280/732
(58) Field of Search ............................. 280/728.2, 732, 280/741

(56) References Cited

U.S. PATENT DOCUMENTS

| | | | | |
|---|---|---|---|---|
| 4,915,410 A | | 4/1990 | Bachelder | 280/732 |
| 5,058,919 A | * | 10/1991 | Paquette et al. | 280/732 |
| 5,326,132 A | * | 7/1994 | Musiol et al. | 280/732 |
| 5,356,174 A | | 10/1994 | Rhein et al. | 280/728 A |
| 5,393,090 A | | 2/1995 | Shepherd et al. | 280/728 A |
| 5,431,436 A | * | 7/1995 | Mossi et al. | 280/732 X |
| 5,433,472 A | | 7/1995 | Green et al. | 280/728.2 |
| 5,474,325 A | * | 12/1995 | Daines et al. | 280/732 X |
| 5,605,347 A | * | 2/1997 | Karlow et al. | 280/728.2 |
| 5,639,112 A | | 6/1997 | Phillion et al. | 280/728.2 |
| 5,676,393 A | * | 10/1997 | Rose | 280/728.2 X |
| 5,752,715 A | * | 5/1998 | Pripps et al. | 280/732 |
| 5,791,684 A | * | 8/1998 | Repp et al. | 280/732 |
| 5,851,023 A | | 12/1998 | Nagata et al. | 280/728.3 |
| 5,941,556 A | | 8/1999 | Rose | 280/728.2 |
| 5,944,340 A | | 8/1999 | Bohn et al. | 280/728.2 |
| 5,947,510 A | | 9/1999 | Athon et al. | 280/728.2 |
| 6,039,341 A | * | 3/2000 | Doxey et al. | 280/728.2 |
| 6,056,313 A | | 5/2000 | Lutz et al. | 280/728.1 |
| 6,092,833 A | | 7/2000 | Nariyasu | 280/728.2 |
| 6,120,056 A | * | 9/2000 | Ryan et al. | 280/728.2 |
| 6,126,191 A | * | 10/2000 | Pepperine et al. | 280/728.2 |
| 6,149,183 A | * | 11/2000 | Ford | 280/728.2 |
| 6,152,479 A | * | 11/2000 | Wagener et al. | 280/728.2 |

FOREIGN PATENT DOCUMENTS

| | | | |
|---|---|---|---|
| DE | 29726246 | | 8/1997 |
| DE | 29706246 U1 | * | 9/1997 |
| DE | 29814233 | | 10/1998 |
| DE | 29813911 | | 11/1998 |
| EP | 0756971 | | 2/1997 |
| EP | 0812738 | | 12/1997 |
| EP | 0856437 | | 8/1998 |
| EP | 876942 A2 | * | 11/1998 |
| GB | 2323572 | * | 9/1998 |
| JP | 911832 | * | 1/1997 |
| JP | 10329638 | * | 12/1998 |
| JP | 411048897 | * | 2/1999 |

OTHER PUBLICATIONS

"Machine Design" article titled "Assembling Plastic Parts" dated Jun. 6, 1991.*

* cited by examiner

*Primary Examiner*—Anne Marie Boehler
*Assistant Examiner*—Bryan Fischmann
(74) *Attorney, Agent, or Firm*—Kathryn A. Marra

(57) ABSTRACT

A air bag module comprises an inflator, a unitary polymeric housing, and an air bag retainer of the same or similar material. The housing has integral walls forming an inflator chamber which include an inflator mounting stud aperture, a plurality of integral supports for the inflator, an integral peripheral rim forming an airbag chamber, and an integral upper wall having inflator gas diffuser apertures. An inflator stud fastener secures the inflator to the housing. The retainer and housing have integral cooperating fasteners for securing the retainer to the housing. A polymeric cover closes the retainer and confines the attached air bag. The housing and retainer are formed of the same recyclable material such that the air bag assembly can be recycled by simply removing only the stud fastener and the inflator. Several embodiments of the housing, retainer and fasteners are disclosed. In one embodiment, an inflator gas diffuser that is integral with the housing.

26 Claims, 5 Drawing Sheets

RECYCLABLE AIRBAG MODULE HOUSING

TECHNICAL FIELD

This invention relates to airbag modules and, more particularly, to an airbag module housing that is recyclable.

BACKGROUND OF THE INVENTION

Manufacturers are continually looking for ways to increase the recyclability of components. In some countries, an ever-increasing content of automobiles has been mandated to be recyclable by the automobile or component manufacturer.

Air bag modules are currently composed of metal and plastic parts that must be disassembled for recycling of its separate different parts. The housing is made of aluminum or steel. Recycling of parts of different compositions is costly, requiring disassembly, segregation of the parts and multiple recycling processes. This variety of materials used and the use of metallic components exacerbates the recycling problem.

It would be desirable to reduce the cost and complexity of recycling air bag modules by providing an air bag assembly that can be recycled without disassembly.

SUMMARY OF THE INVENTION

It is therefore an object of this invention to provide an air bag assembly that can be recycled without disassembly.

In one aspect this invention features a housing assembly for an airbag which comprises an inflator housing and an air bag retainer, in which the inflator housing is a unitary structure made of a recyclable plastic which incorporates integral supports for an inflator. The air bag retainer is made of the same recyclable plastic, and cooperating fasteners formed on the housing and the retainer secure the retainer to the housing, such that the housing and retainer can be recycled together without disassembly. Preferably, the housing includes an integral inflator gas diffuser.

In another aspect, the housing includes an upper wall which cooperates with the side and end walls to define an inflator cavity, the upper wall including spaced inflator gas diffusing apertures which comprise the integral gas diffuser.

In a further aspect, this invention features an inflator, a unitary housing having integral walls forming an inflator chamber including an inflator mounting stud aperture, a plurality of integral supports for the inflator, an integral peripheral rim forming an airbag chamber, an integral upper wall having inflator gas diffuser apertures, an inflator stud fastener for securing the inflator to the housing, an air bag retainer, and cooperating fasteners on the housing and on the retainer for securing the retainer to the housing. The housing and retainer are formed of the same recyclable material such that the air bag assembly can be recycled after removing only the inflator and stud fastener.

These and other objects and features of this invention will become readily apparent upon reference to the following detailed description of this invention, as illustrated in the attached drawings, in which:

DESCRIPTION OF THE PREFERRED EMBODIMENT

Figure 1:
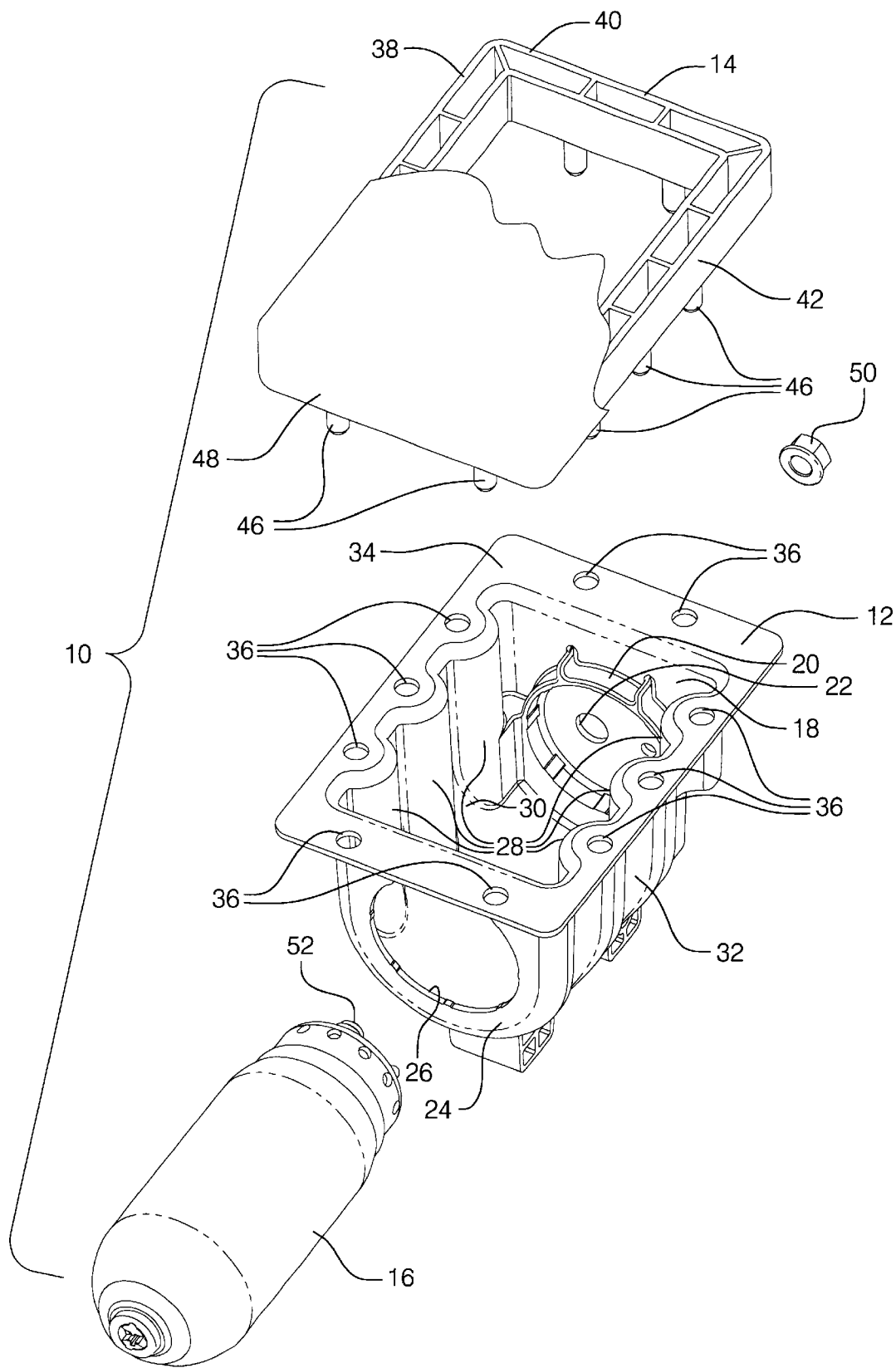
FIG. 1 is an exploded perspective view of one embodiment of recyclable air bag assembly according to this invention.

FIG. 1 shows an air bag module 10 comprising a housing 12, an air bag retainer 14 and an inflator 16. Housing 12 is generally U-shaped, having one end wall 18 formed with an inflator locating collar 20 and a stud aperture 22. The opposing end wall 24 includes a circular opening 26 for admitting inflator 16 into housing 12, where it is laterally confined by ribs 28 formed in side walls 30 and 32. The walls of housing 12 terminate in a peripheral flange 34 that includes a plurality of spaced holes 36.

Air bag retainer 14 has a first peripheral segment 38, a second peripheral segment 40, a third peripheral segment 42, and a fourth peripheral segment (not shown) each have depending rods 46 which each align with one of the housing holes 36. Both housing 12 and retainer 14 are preferably made of the same polymeric material, preferably being a nylon or polyester material. An air bag (not illustrated) is preferably sewn in a well-known manner to retainer 14 which is assembled to housing 12 by inserting rods 46 into holes 36. Thereafter, the ends of rods 46 can be heat staked to secure retainer 14 to housing 12. Alternatively, rods 46 can be threaded, and plastic nuts (not illustrated) can be screwed onto the threads rods to secure retainer 14 to housing 12. After assembly, a polymeric cover 48 is snapped over retainer 14 to complete the assembly.

Housing 12 and retainer 14 are both unitary members and they and cover 48 ideally are made of the same polymeric material, such as nylon or polyester for ease in recycling. Module 10 is easily recycled by merely removing an inflator stud retention nut 50 from inflator stud 52, inflator 16 is slid out of housing 12 through opening 26, and the housing 12 and retainer 14 (and cover 48 and the air bag, if still attached) can be recycled together.

Figure 2:
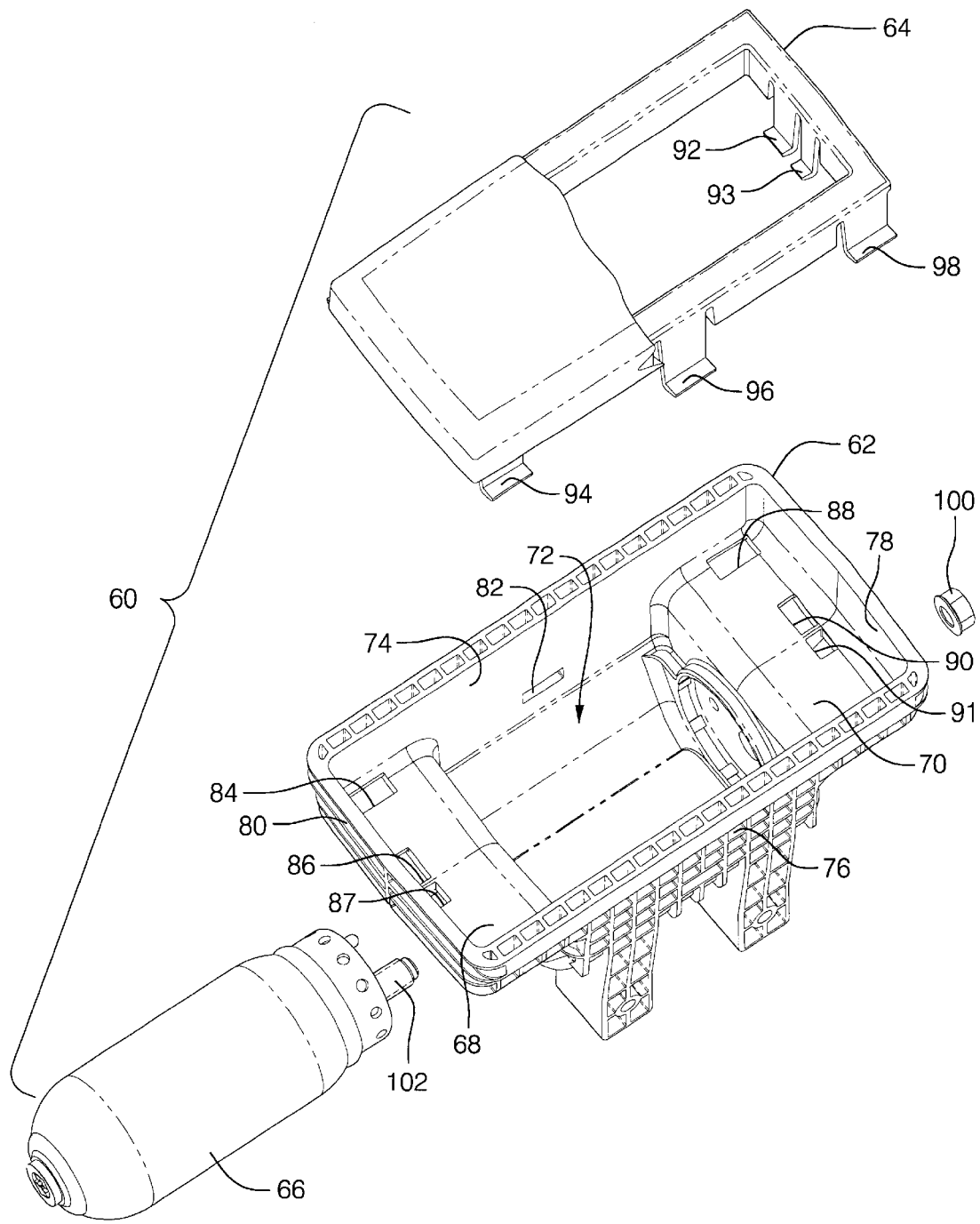
FIG. 2 is an exploded perspective view of another embodiment of recyclable air bag assembly according to this invention.

Another embodiment of air bag module 60 is shown in FIG. 2 as comprising a unitary housing 62, a retainer 64 and an inflator 66. Here, again housing 62 and retainer 64 are preferably made of the same or similar polymeric material, such as nylon. As can be seen, the housing 62 has a different shape and the means of fastening retainer 64 to housing 62 is different. Housing 62 has ledges 68 and 70 extending from the inflator receiving chamber 72, flanked by upstanding peripheral front and rear walls 74, 76 and side walls 78 and 80.

The side walls include identical slots 82 (only one visible), while rear ledge 68 has identical side slots 84 (only one visible) and a pair of central slots 86, 87. Front ledge 70 has identical side slots 88 (only one visible) and a pair of central slots 90, 91. Retainer 64 has depending flexible footed legs or snaps 92, 93 on each end (only one end visible) and three flexible spaced footed snaps 94, 96, 98 on each side (only one side visible).

After inflator 66 is installed in inflator receiving chamber 72 by securing stud nut 100 onto inflator mounting stud 102, retainer 64 (with an air bag conventionally sewn thereto, not illustrated) is placed on housing 62 and forced downward. This will cause snaps 92, 93 to enter slots 90, 91 and 86, 87, and cause snaps 94, 96, 98 to enter slots 84, 82, 88, where the snap feet will snap under the adjacent housing surfaces to secure retainer 64 to housing 62.

Figure 3:
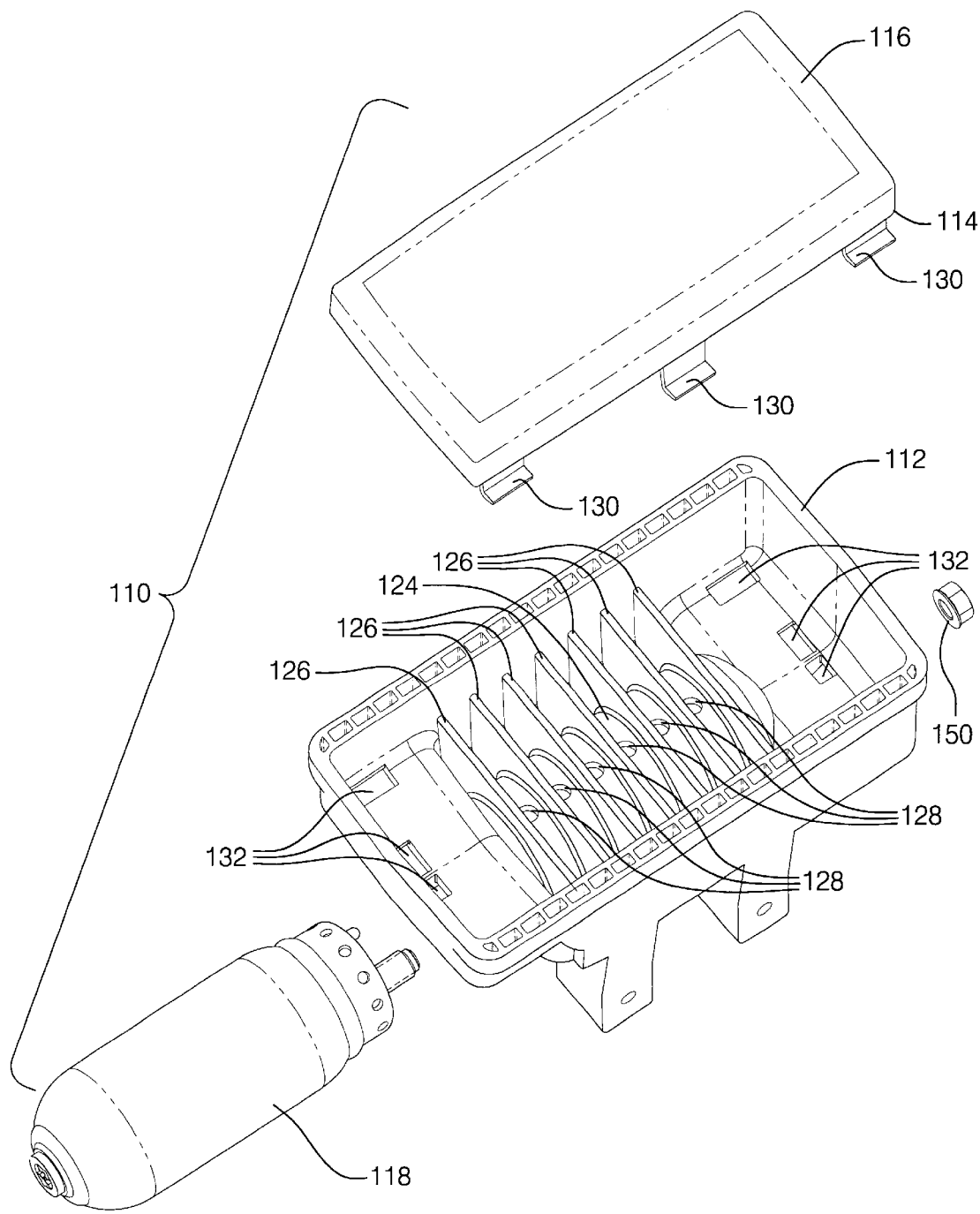
FIG. 3 is an exploded perspective view of yet another embodiment of recyclable air bag assembly according to this invention.
Figure 4:
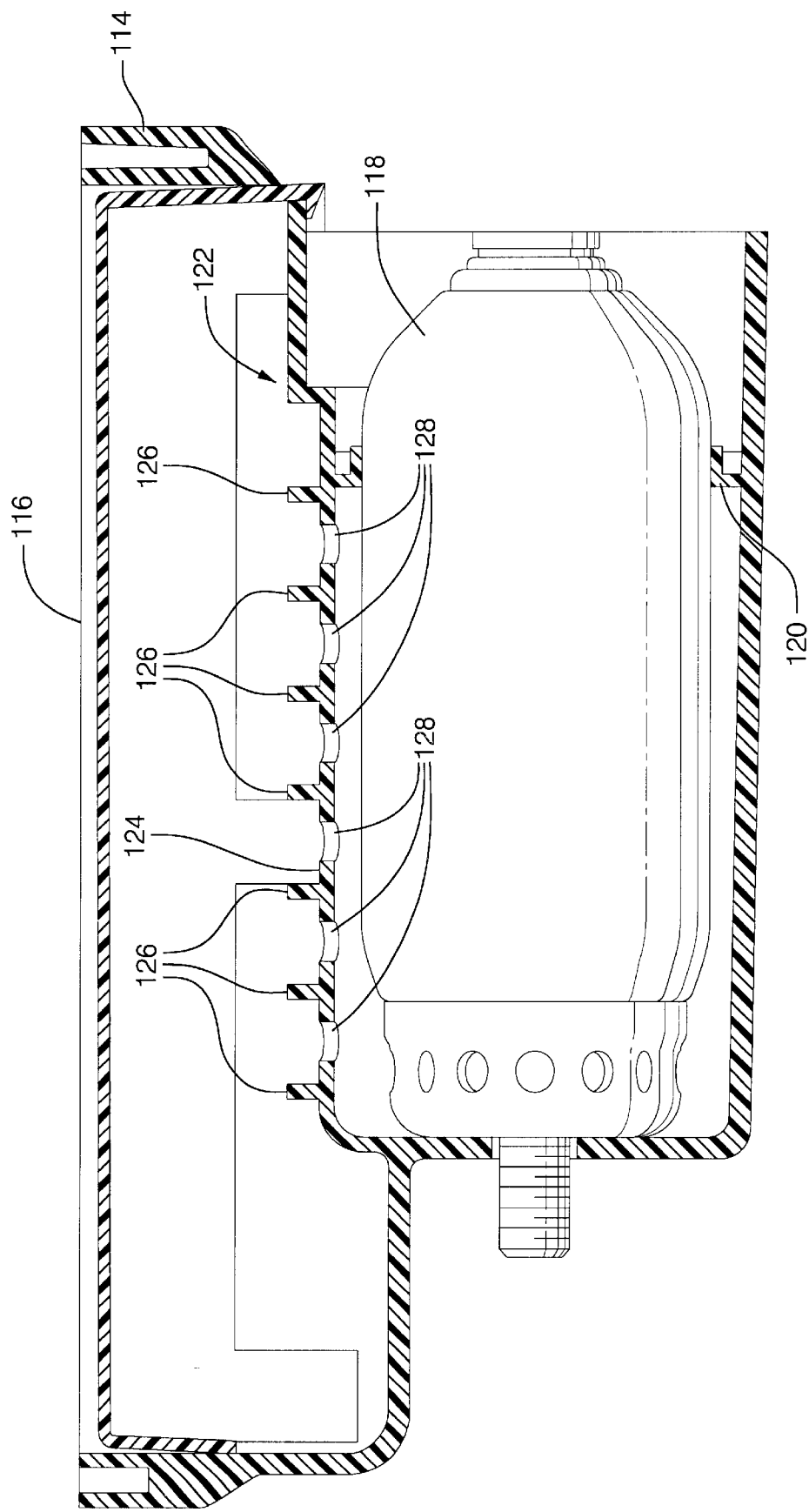
FIG. 4 is a longitudinal sectional view of the recyclable air bag assembly of FIG. 3.
Figure 5:
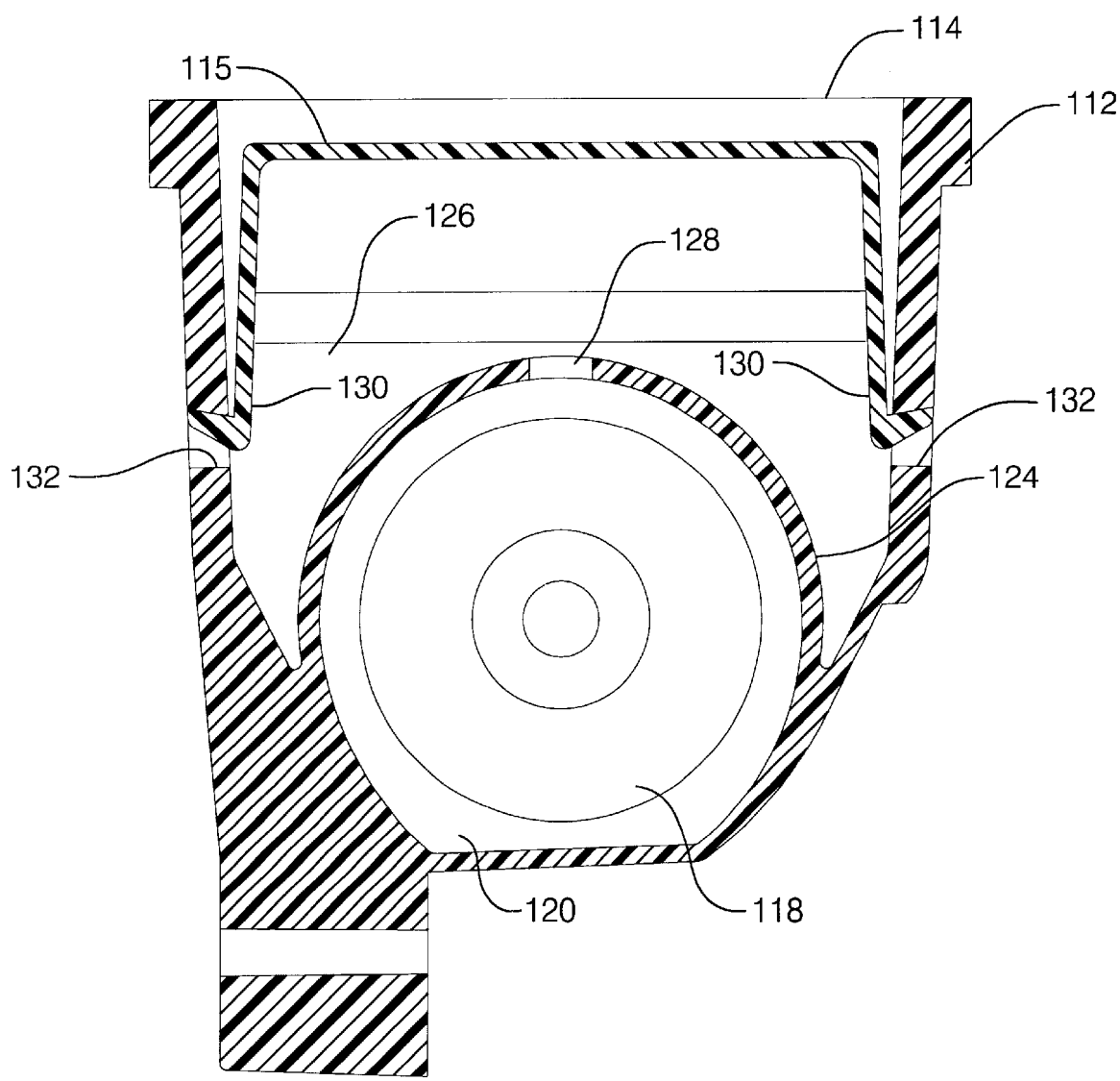
FIG. 5 is a transverse sectional view of the recyclable air bag assembly of FIG. 3.

Another embodiment of air bag module 110 is shown in FIGS. 3, 4 and 5 as comprising a unitary inflator housing 112, an air bag retainer 114 having an air bag 115 and a cover 116 and an inflator 118. Housing 112 includes an integral inflator cradle 120 and an integral inflator gas diffuser 122, which comprises an upper wall 124 and spaced strengthening ribs 126 spaced between diffuser holes 128. Retainer 114 includes depending footed snaps 130 (not all shown) which cooperate with slots 132 (not all shown) in housing 112 to secure retainer 114 to housing 112, much as in the FIG. 2 embodiment.

Thus, instead of utilizing a metal gas diffuser insert, which would have to be disassembled for recycling as is usual, this embodiment provides an air bag module that has an integral diffuser which simplifies the recycling process. All embodiments of this invention provide an air bag module that requires only removal of the inflator for recycling.

While only three embodiments have been shown and described, other modifications are contemplated within the scope of this invention and the attached claims.

We claim:

1. A recyclable air bag assembly comprising:
   a) an inflator having an inflator stud;
   b) a unitary housing having integral walls forming an inflator chamber, said inflator chamber including an inflator passage opening formed in the unitary housing, an inflator mounting stud aperture, a plurality of integral supports for the inflator, an integral peripheral rim forming an airbag chamber, an integral upper wall having inflator gas diffuser apertures formed therein, and a peripheral flange expanding outwardly from said airbag chamber;
   c) an inflator stud fastener for securing the inflator to the housing, said inflator stud depending outwardly from said unitary housing when said inflator is inserted into said inflator chamber through said inflator chamber opening;
   d) an air bag retainer having an inflatable cushion secured thereto; and
   e) a plurality of fasteners for being secured into a plurality of fastener openings in said flange, wherein the housing, the retainer, the inflatable cushion, and the fasteners are formed of materials that are recyclable together such that the air bag assembly can be recycled as a single unit only after removing only the stud fastener from the inflator and passing the inflator from the inflator chamber through the inflator passage opening.

2. The recyclable air bag assembly as in claim 1, wherein the housing includes an integral inflator gas diffuser.

3. The recyclable air bag assembly as in claim 1, wherein the recyclable material is a plastic.

4. The recyclable air bag assembly as in claim 1, wherein the integral supports include a locating collar located opposite the inflator passage opening, the integral supports serving to align the inflator within the inflator cavity.

5. The recyclable air bag assembly as in claim 1, wherein said peripheral flange is located above said inflator cavity.

6. The recyclable air bag assembly as in claim 1, wherein said opening is configured, dimensioned and positioned to allow said inflator to be inserted and/or removed from said inflator cavity while said air bag retainer is secured to said housing assembly.

7. The recyclable air bag assembly as in claim 1, wherein said plurality of cooperating fasteners includes a plurality of securing members which are configured, dimensioned and positioned to be received within a plurality of apertures in said inflator housing.

8. The recyclable air bag housing assembly as in claim 7, wherein said plurality of securing members are heat staked to secure said air bag retainer to said inflator housing.

9. A method for providing a recyclable air bag module housing, comprising:
   a) molding a housing of a recyclable material, said housing having an access opening, a securement opening and an inflation passageway;
   b) inserting an inflator into said access opening in a first side wall of said housing, said inflator having a mounting stud that protrudes through said securement opening when said inflator is inserted into said housing, said securement opening being positioned in a second side wall of said housing; and
   c) fixedly mounting an air bag retainer to an upper periphery of said housing via a plurality of mounting studs such that an inflatable cushion is in fluid communication with said inflator, said upper periphery providing a perimeter to said inflation passageway, said air bag retainer, and said mounting studs being formed of said recyclable material, wherein said inflatable cushion is formed of a second material that is recyclable together with said recyclable material.

10. The method as in claim 9, wherein said retainer is fixedly mounted to said upper periphery of said housing by heat staking said plurality of mounting studs of said retainer into a plurality of mounting openings in said housing.

11. The method as in claim 10, wherein said plurality of mounting openings are located on a peripheral flange extending outwardly from said housing.

12. A recyclable air bag housing assembly, comprising:
   a) an inflator housing having an inflator cavity for receiving an inflator;
   b) a diffuser with a plurality of diffuser openings for providing fluid communication to said inflator cavity;
   c) an airbag cavity positioned above said inflator cavity and said diffuser, said airbag cavity being in fluid communication with said inflator cavity;
   d) a flange disposed around the perimeter of said airbag cavity, said flange depending outwardly from said inflator housing and having a securement surface with a plurality of securement openings;
   e) an air bag retainer for securing an air bag to said housing assembly so that said inflator may inflate said air bag, said air bag retainer having a plurality of securement studs for being received within said securement openings; and
   f) an opening formed in said inflator housing, said opening being configured and dimensioned to allow said inflator to be inserted into said inflator cavity and be removed from said inflator cavity without having to remove said air bag retainer, said inflator being constructed out of a first material and said inflator housing, said securement studs, and said air bag retainer being constructed out of a second material, said inflatable cushion being constructed out of a third material, said third material and said second material being recyclable together, said inflator housing having integral supports for supporting the inflator in the inflator cavity.

13. The recyclable air bag housing assembly as in claim 12, wherein said plurality of securement studs are integral with said air bag retainer.

14. The recyclable air bag housing assembly as in claim 13, wherein said second material is plastic.

15. The recyclable air bag housing assembly as in claim 14, wherein said plurality of securement studs are heat staked to said flange.

16. The recyclable air bag housing assembly as in claim 12, wherein said plurality of securement studs are heat staked to said flange.

17. A recyclable air bag module for use with an inflator having an inflator mounting stud at an end, comprising:

a housing having walls, a base and an open top defining an inflation chamber, a first of said walls having an inflator passage opening, a second of said walls being opposite said first of said walls and having an inflator mounting stud aperture, the inflator being receivable through said inflator opening such that the end having the inflator mounting stud is receivable through said inflator mounting stud aperture, said housing being formed of a recyclable polymer material;

an inflatable cushion;

an air bag retainer being secured to said inflatable cushion and being configured to be secured to said housing above an axis defined through said inflator passage opening and said inflator mounting stud aperture, said air bag retainer being formed of said recyclable polymer material; and fasteners for securing said air bag retainer to said housing, said fasteners being formed of said recyclable polymer material, wherein said inflatable cushion is formed of a material that is recyclable together with said recyclable polymer material such that the air bag module is recyclable as a single unit only after removing only the inflator mounting stud from said inflator mounting stud aperture and passing the inflator from said inflator chamber through said inflator passage opening.

18. The recyclable air bag module of claim 17, wherein said housing further comprises:

an inflator cavity defined in said inflation chamber, said inflator cavity being configured to receive the inflator along said axis; and an airbag cavity defined in said inflation chamber, said airbag cavity being positioned above said inflator cavity, said airbag cavity being in fluid communication with said inflator cavity.

19. The recyclable air bag module of claim 18, herein said housing further comprises:

a diffuser disposed between said inflator cavity and said airbag cavity, said diffuser having a plurality of diffuser openings for providing fluid communication between said inflator cavity and said air bag cavity.

20. The recyclable air bag module of claim 19, wherein said housing further comprises:

a flange disposed around an upper perimeter of said air bag cavity, said flange depending outwardly from said housing and having a plurality of securement openings, and said fasteners being a plurality of securement studs extending from said air bag retainer and being receivable by said plurality of securement openings.

21. The recyclable air bag module of claim 20, wherein said fasteners are heat staked to secure said air bag retainer to said housing.

22. A air bag module for use with an inflator having an inflator mounting stud at an end, comprising:

a housing having walls, a base and an open top defining an inflation chamber, a first of said walls having an inflator passage opening, a second of said walls being opposite said first of said walls and having an inflator mounting stud aperture, the inflator being receivable through said inflator opening such that the end having the inflator mounting stud is receivable through said inflator mounting stud aperture, said housing being formed of a nylon or polyester material;

an air bag retainer being formed of said nylon or polyester material;

a plurality of fasteners being formed of said nylon or polyester material, said plurality of fasteners being configured to secure said air bag retainer to said housing across said open top of said inflation chamber; and an inflatable cushion being secured by said air bag retainer across said open top of said inflation chamber, wherein said inflatable cushion is formed of a material such that said housing, said air bag retainer, said plurality of fasteners, and said inflatable cushion can be recycled together after removing the inflator mounting stud from said inflator mounting stud aperture and passing the inflator from said inflator chamber through said inflator opening.

23. The air bag module as in claim 22, further comprising:

a cover being secured over said air bag retainer, said cover also being formed of said nylon or polyester material such that said housing, said air bag retainer, said plurality of fasteners, said cover, and said inflatable cushion can be recycled together after removing the inflator mounting stud from said inflator mounting stud aperture and passing the inflator from said inflator chamber through said inflator opening.

24. A air bag module adapted for use with an inflator, comprising:

a housing, an air bag retainer, and a plurality of fasteners all being formed of a nylon or polyester material; and an inflatable cushion being secured by said air bag retainer across an open top of said housing, wherein said inflatable cushion is formed of a material such that said housing, said air bag retainer, said plurality of fasteners, and said inflatable cushion can be recycled together without disassembly.

25. The air bag module as in claim 24, further comprising:

a cover being secured over said air bag retainer, said cover also being formed of said nylon or polyester material such that said housing, said air bag retainer, said plurality of fasteners, said cover, and said inflatable cushion can be recycled together without disassembly.

26. The air bag module as in claim 25, wherein said housing, said air bag retainer, said plurality of fasteners, and said cover are formed of nylon.

* * * * *